US012700931B2

(12) United States Patent
    Bora

(10) Patent No.: US 12,700,931 B2
(45) Date of Patent: Aug. 4, 2026

(54) DOMESTIC APPLIANCE COMMISSIONING

(71) Applicant: Haier US Appliance Solutions, Inc.,
                Wilmington, DE (US)

(72) Inventor: Anand Ashok Bora, Louisville, KY
               (US)

(73) Assignee: Haier US Appliance Solutions, Inc.,
               Wilmington, DE (US)

( * ) Notice: Subject to any disclaimer, the term of this
              patent is extended or adjusted under 35
              U.S.C. 154(b) by 328 days.

(21) Appl. No.: 18/610,884

(22) Filed: Mar. 20, 2024

(65) Prior Publication Data

US 2025/0300746 A1      Sep. 25, 2025

(51) Int. Cl.
     *H04L 12/26*      (2006.01)
     *H04B 17/318*     (2015.01)
     *H04W 4/30*       (2018.01)
     *H04W 84/12*      (2009.01)

(52) U.S. Cl.
     CPC ............ *H04B 17/318* (2015.01); *H04W 4/30*
          (2018.02); *H04W 84/12* (2013.01)

(58) Field of Classification Search
     CPC ..... H04L 47/10; H04L 43/50; H04L 12/2697;
                H04L 43/0852; H04L 43/00; H04L
                2012/2841; H04L 2012/285; H04L
                12/2807; H04B 17/318; H04W 4/30;
                           H04W 84/12; H04W 4/80
     See application file for complete search history.

(56) References Cited

U.S. PATENT DOCUMENTS 11,102,029 B1 *   8/2021   Kinney ............... H04L 12/2818
     11,294,341 B2 *   4/2022   Chenier ................ G05B 15/02
     11,570,702 B2     1/2023   Kim et al.
     2015/0126126 A1 * 5/2015   Lee ......................... H04W 4/80
                                                              455/41.3
     2020/0351781 A1   11/2020  Hariharan et al.
     2023/0354004 A1 * 11/2023  Kwon ................... H04L 12/283
     2024/0129155 A1 * 4/2024   Lee ..................... H04L 12/2807
     2025/0030571 A1 * 1/2025   Hahn .................. H04L 12/2816
     2025/0133380 A1 * 4/2025   Yan ........................ G08C 17/02

FOREIGN PATENT DOCUMENTS

CN        114222275 A  *  3/2022  ............ H04W 76/14
     WO        WO2022270765 A1   12/2022

* cited by examiner

*Primary Examiner* — Phuongchau Ba Nguyen
(74) *Attorney, Agent, or Firm* — Dority & Manning, P.A.

(57)                    ABSTRACT

A domestic appliance or method of commissioning may
include establishing a wireless connection between a previ-
ously commissioned appliance and an uncommissioned
appliance over a secondary connection channel. A method
may also include transmitting a signal-strength request to the
uncommissioned appliance from the previously commis-
sioned appliance. The method may further include receiving
signal-strength data corresponding to a local wireless net-
work from the uncommissioned appliance. The method may
still further include evaluating the signal-strength data and
initiating a user alert from the previously commissioned
appliance based on the evaluated signal-strength data.

14 Claims, 5 Drawing Sheets

500

ESTABLISH A WIRELESS CONNECTION BETWEEN A
PREVIOUSLY COMMISSIONED APPLIANCE AND AN
UNCOMMISSIONED APPLIANCE — 510

TRANSMITTING A SIGNAL-STRENGTH REQUEST — 520

RECEIVING SIGNAL-STRENGTH DATA — 530

EVALUATING THE SIGNAL-STRENGTH DATA — 540

INITIATING A USER ALERT — 550

500

ESTABLISH A WIRELESS CONNECTION BETWEEN A
PREVIOUSLY COMMISSIONED APPLIANCE AND AN
UNCOMMISSIONED APPLIANCE  — 510

TRANSMITTING A SIGNAL-STRENGTH REQUEST  — 520

RECEIVING SIGNAL-STRENGTH DATA  — 530

EVALUATING THE SIGNAL-STRENGTH DATA  — 540

INITIATING A USER ALERT  — 550

DOMESTIC APPLIANCE COMMISSIONING

FIELD OF THE DISCLOSURE

The present subject matter relates generally to domestic appliances that can connect to a home network or a remote network such as the internet, and more particularly, to improved commissioning of such appliances to a user account.

BACKGROUND OF THE DISCLOSURE

Domestic (e.g., household) appliances are utilized generally for a variety of tasks by a variety of users. For example, a household may include such appliances as laundry appliances (e.g., a washing machine or dryer appliance), kitchen appliances (e.g., a refrigerator, a microwave, a coffee maker, etc.), along with room air conditioners and various other appliances.

Some domestic appliances can also include features for connecting to and communicating over a wireless network. Such communication may provide connected features on the domestic appliances to permit the domestic appliance to communicate with a personal device, smart home systems, or a remote database such as a cloud server.

Existing domestic appliances that can connect to a wireless network or communicate with each other often do so indirectly, such as through a common WI-FI® router or network. In order to make such communication possible, or to permit communication between a new (i.e., uncommissioned) appliance and a remote server, a new appliance must generally connect to one or more wireless networks. Unfortunately, issues can arise during the commissioning process. Experience has demonstrated that many users will not attempt to commission an appliance more than once, so any difficulties can greatly affect a user's use or satisfaction with an appliance.

Some issues can be linked to an unreliable or unstable wireless connection. In the case of a home or local network (e.g., WI-FI® network), the stability or strength of the wireless signal to a router may vary greatly, even within the same building or distance. Nonetheless, it can be especially difficult for a user to know if such issues are causing problems or how such issues may be resolved.

Accordingly, there exists a need for an appliance that can be connected to a secured wireless network and added to a user account in an easier or more assured manner.

BRIEF DESCRIPTION OF THE DISCLOSURE

Aspects and advantages of the invention will be set forth in part in the following description, or may be obvious from the description, or may be learned through practice of the invention.

In one exemplary aspect of the present disclosure, a method of commissioning a domestic appliance is provided. The method may include establishing a wireless connection between a previously commissioned appliance and an uncommissioned appliance over a secondary connection channel. The method may also include transmitting a signal-strength request to the uncommissioned appliance from the previously commissioned appliance. The method may further include receiving signal-strength data corresponding to a local wireless network from the uncommissioned appliance. The method may still further include evaluating the signal-strength data and initiating a user alert from the previously commissioned appliance based on the evaluated signal-strength data.

In another exemplary aspect of the present disclosure, a domestic appliance is provided. The domestic appliance may include a cabinet and a controller configured to initiate a commissioning operation. The commissioning operation may include establishing a wireless connection between the domestic appliance and an uncommissioned appliance over a secondary connection channel, transmitting a signal-strength request to the uncommissioned appliance from the domestic appliance, receiving signal-strength data corresponding to a local wireless network from the uncommissioned appliance, evaluating the signal-strength data, and initiating a user alert from the domestic appliance based on the evaluated signal-strength data.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
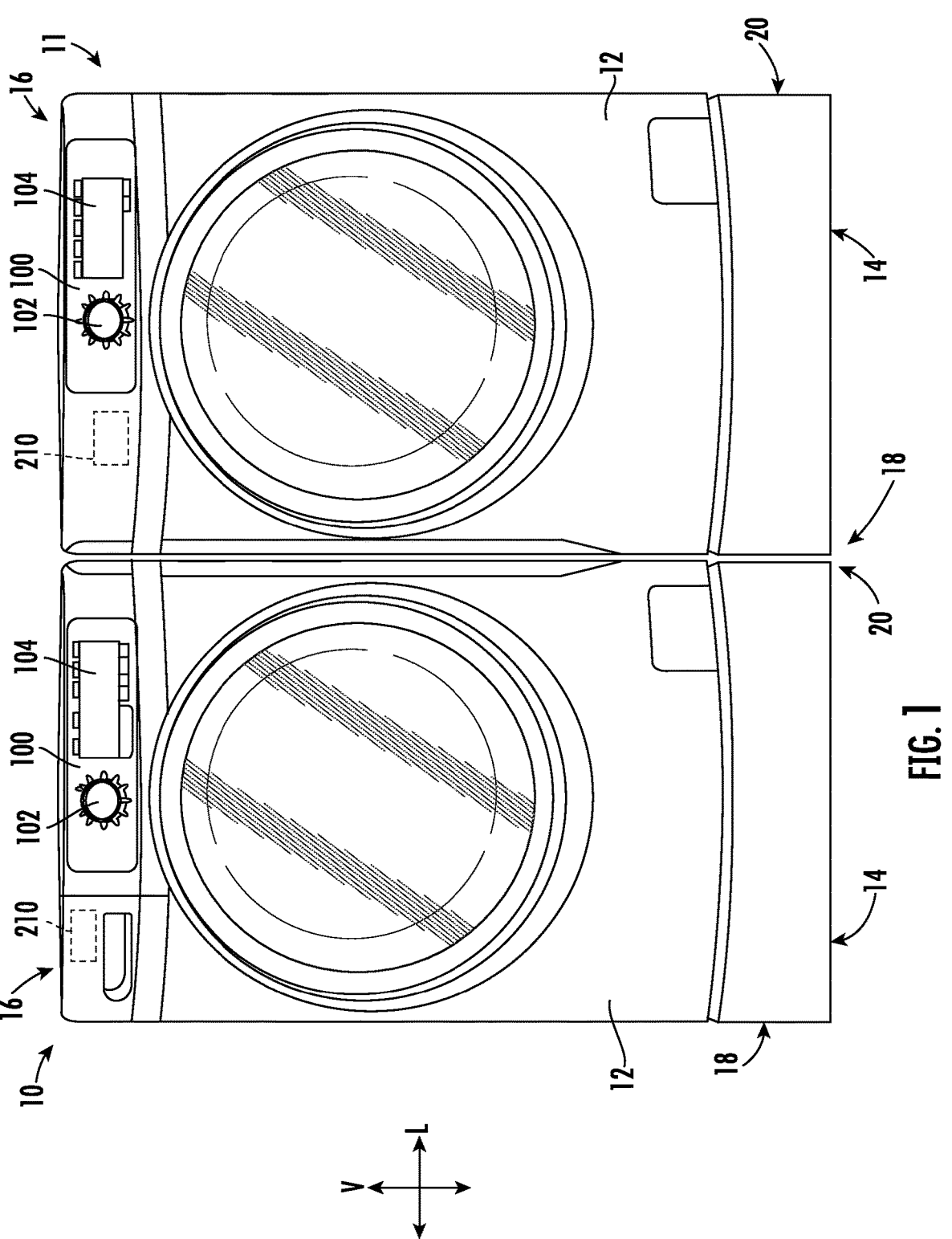
FIG. 1 provides a front, elevation view of laundry appliances in accordance with exemplary embodiments of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents. The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components or systems. For example, the approximating language may refer to being within a 10 percent margin (i.e., including values within ten percent greater or less than the stated value). In this regard, for example, when used in the context of an angle or direction, such terms include within ten degrees greater or less than the stated angle or direction (e.g., "generally vertical" includes forming an angle of up to ten degrees in any direction, such as, clockwise or counterclockwise, with the vertical direction V).

Except as explicitly indicated otherwise, recitation of a singular processing element (e.g., "a controller," "a processor," "a microprocessor," etc.) is understood to include more than one processing element. In other words, "a processing element" is generally understood as "one or more processing element." Furthermore, barring a specific statement to the contrary, any steps or functions recited as being performed by "the processing element" or "said processing element" are generally understood to be capable of being performed by "any one of the one or more processing elements." Thus, a first step or function performed by "the processing element" may be performed by "any one of the one or more processing elements," and a second step or function performed by "the processing element" may be performed by "any one of the one or more processing elements and not necessarily by the same one of the one or more processing elements by which the first step or function is performed." Moreover, it is understood that recitation of "the processing element" or "said processing element" performing a plurality of steps or functions does not require that at least one discrete processing element be capable of performing each one of the plurality of steps or functions.

Figure 2:
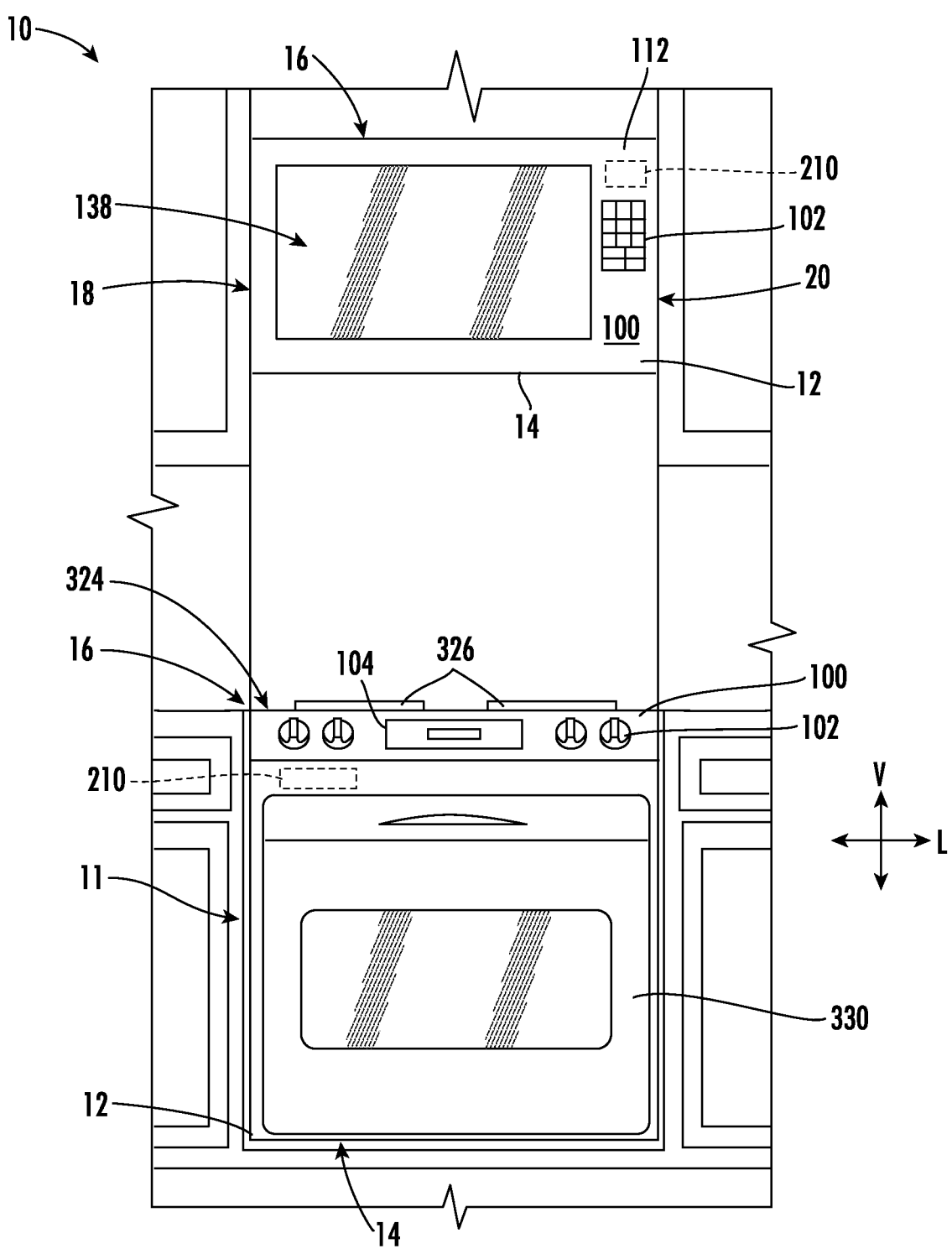
FIG. 2 provides a front, elevation view of kitchen appliances in accordance with exemplary embodiments of the present disclosure.

As may be seen in FIGS. 1 and 2, in accordance with one or more embodiments of the present disclosure, one or more appliances, such as a first appliance 10 and a second appliance 11, may be provided. The illustrated group of two appliances is provided by way of example only. Various embodiments of the present subject matter may also include only one or three or more appliances.

As generally shown throughout FIGS. 1 and 2, each appliance 10 and 11 includes a cabinet 12 that defines a vertical direction V, a lateral direction L, and a transverse direction T that are mutually perpendicular. Each cabinet 12 extends between a top side 16 and a bottom side 14 along the vertical direction V. Each cabinet 12 also extends between a left side 18 and a right side 20 (e.g., along the lateral direction L) and a front side 22 and a rear side 24 (e.g., along the transverse direction T).

Each appliance 10 and 11 may include a user interface panel 100 and a user input device 102, which may be positioned on an exterior of the cabinet 12. The user input device 102 is generally positioned proximate to the user interface panel 100, and in some embodiments, the user input device 102 is positioned on the user interface panel 100.

In various embodiments, the user interface panel 100 may represent a general purpose I/O ("GPIO") device or functional block. In some embodiments, the user interface panel 100 may include or be in operative communication with user input device 102, such as one or more of a variety of digital, analog, electrical, mechanical or electro-mechanical input devices including rotary dials, control knobs, push buttons, and touch pads. The user interface panel 100 may include a display component 104, such as a digital or analog display device designed to provide operational feedback to a user. The display component 104 may also be a touchscreen capable of receiving a user input, such that the display component 104 may also be a user input device in addition to or instead of the user input device 102.

Generally, one or more devices may include a controller 210. For instance, each appliance 10 and 11 may include a separate controller 210 in operative communication with the corresponding user input device 102. The user interface panel 100 and the user input device 102 may be in communication with the controller 210 via, for example, one or more signal lines or shared communication busses. Input/output ("I/O") signals may be routed between controller 210 and various operational components of the appliances 10 and 11. Operation of the appliances 10 and 11 may each be regulated by the respective controller 210 that is operatively coupled to the corresponding user interface panel 100. A user interface panel 100 may for example provide selections for user manipulation of the operation of an appliance (e.g., via user input device 102 or display 104). In response to user manipulation of the user interface panel 100 or user input device 102, the controller 210 may operate various components of the appliance 10 or 11. Each controller 210 may include a memory and one or more microprocessors, CPUs, or the like, such as general or special purpose microprocessors operable to execute programming instructions or microcontrol code associated with operation of the appliance 10 or 11. The memory may represent random access memory such as DRAM, or read only memory such as ROM or FLASH. In some embodiments, the processor executes programming instructions stored in memory. The memory may be a separate component from the processor or may be included onboard within the processor. Alternatively, a controller 210 may be constructed without using a microprocessor (e.g., using a combination of discrete analog or digital logic circuitry; such as switches, amplifiers, integrators, comparators, flip-flops, AND gates, and the like) to perform control functionality instead of relying upon software.

The controller 210 may be programmed to operate the respective device or appliance (e.g., 10 or 11) by executing instructions stored in memory. For example, the instructions may be software or any set of instructions that when executed by the processing device, cause the processing device to perform operations. Controller 210 can include one or more processor(s) and associated memory device(s) configured to perform a variety of computer-implemented functions or instructions (e.g. performing the methods, steps, calculations, etc. and storing relevant data, as disclosed herein). It should be noted that controllers 210 as disclosed herein are capable of, and may be operable to perform, any methods and associated method steps (e.g., as, or as part of, a secure communication operation) as disclosed herein.

In some embodiments, for example, as illustrated in FIG. 1, a pair of laundry appliances may be provided as the first appliance 10 and the second appliance 11. In the exemplary embodiment illustrated in FIG. 1, the first appliance 10 may be a washing machine appliance and the second appliance 11 may be a dryer appliance. In embodiments such as illustrated in FIG. 1, the user input device 102 of each appliance 10 and 11 may be positioned on the user interface panel 100. The embodiment illustrated in FIG. 1 also includes a display 104 on the user interface panel 100.

FIG. 2 illustrates another exemplary embodiment of a group of appliances where the first appliance 10 or the second appliance 11 is/are kitchen appliances. In this example, the first appliance 10 is a microwave oven appliance that is generally positioned above the second appliance 11, which is a cooktop appliance (e.g., along the vertical direction V).

Microwave oven appliance as first appliance 10 includes a cabinet 12. A cooking chamber is defined within the cabinet 12 of the microwave oven appliance. The cooking chamber is accessible via a door 112 and viewable through a window 138 in the door 112. The microwave oven appliance is configured to heat articles (e.g., food or beverages) within the cooking chamber using electromagnetic radiation. The microwave oven appliance may include various components that operate to produce the electromagnetic radiation, as is generally understood. For example, the microwave oven appliance may include a magnetron (such as, for example, a cavity magnetron), a high voltage transformer, a high voltage capacitor, and a high voltage diode. The transformer may provide energy from a suitable energy source (such as an electrical outlet) to the magnetron. The magnetron may convert the energy to electromagnetic radiation, specifically microwave radiation. The capacitor generally connects the magnetron and transformer, such as via high voltage diode, to a chassis. Microwave radiation produced by the magnetron may be transmitted through a waveguide to the cooking chamber. The structure and intended function of microwave ovens are generally understood by those of ordinary skill in the art and are not described in further detail herein.

As shown, cooktop appliance as second appliance 11 includes a chassis or cabinet 12 that extends along the vertical direction V between a top side 16 and a bottom side 14. The cooktop appliance can include a cooktop surface 324 having one or more heating elements 326 for use in, for example, heating or cooking operations. In exemplary embodiments, cooktop surface 324 is constructed with ceramic glass. In other embodiments, however, cooktop surface 324 may include any another suitable material, such as a metallic material (e.g., steel) or another suitable non-metallic material. Heating elements 326 may be various sizes and may employ any suitable method for heating or cooking an object, such as a cooking utensil (not shown), and its contents. In one embodiment, for example, heating element 326 uses a heat transfer method, such as electric coils or gas burners, to heat the cooking utensil. In another embodiment, however, heating element 326 uses an induction heating method to heat the cooking utensil directly. In various embodiments, the heating elements 326 may include one or more of a gas burner element, resistive heat element, radiant heat element, induction element, or another suitable heating element.

In some embodiments, the cabinet 12 of the cooktop appliance may be insulated and may define a cooking chamber selectively enclosed by a door 330. One or more heating elements (e.g., top broiling elements or bottom baking elements) may be positioned within cabinet 12 of the cooktop appliance to heat the cooking chamber. Heating elements within the cooking chamber may be provided as any suitable element for cooking the contents of cooking chamber, such as an electric resistive heating element, a gas burner, a microwave element, a halogen element, etc. Thus, the cooktop appliance may be referred to as an oven range appliance. As will be understood by those skilled in the art, the cooktop appliance is provided by way of example only, and the present subject matter may be used in the context of any suitable cooking appliance, such as a double oven range appliance or a standalone cooktop (e.g., fitted integrally with a surface of a kitchen counter). Thus, the exemplary embodiments illustrated and described are not intended to limit the present disclosure to any particular cooking chamber or heating element configuration, unless explicitly indicated as such.

As illustrated, a user interface panel 100 may be provided on the cooktop appliance. Although shown at front portion of the cooktop appliance, another suitable location or structure (e.g., a backsplash) for supporting user interface panel 100 may be provided in alternative embodiments. In some embodiments, user interface panel 100 includes input components or controls 102, such as one or more of a variety of electrical, mechanical, or electro-mechanical input devices. Controls 102 may include, for example, rotary dials, knobs, push buttons, and touch pads. A controller 210 is in communication with user interface panel 100 and controls 102 through which a user may select various operational features and modes and monitor progress of the cooktop appliance. In additional or alternative embodiments, user interface panel 100 includes a display component, such as a digital or analog display in communication with a controller 210 and configured to provide operational feedback to a user. In certain embodiments, user interface panel 100 represents a general purpose I/O ("GPIO") device or functional block.

As shown, controller 210 is communicatively coupled (i.e., in operative communication) with user interface panel 100 and its controls 102. Controller 210 may also be communicatively coupled with various operational components of cooktop appliance 300 as well, such as heating elements (e.g., 326, 332), sensors, and the like. Input/output ("I/O") signals may be routed between controller 210 and the various operational components of the cooktop appliance. Thus, controller 210 can selectively activate and operate these various components. Various components of the cooktop appliance are communicatively coupled with controller 210 via one or more communication lines such as, for example, conductive signal lines, shared communication busses, or wireless communications bands.

According to various embodiments of the present disclosure, the appliances 10 or 11 may take the form of any of the examples described above, or may be any other domestic appliance where it is desired to have improved ease of secure communication (e.g., direct communication) between at least two appliances (e.g., appliances 10 and 11). Such appliances may be commissioned or added (e.g., previously added) a common user account, which may include a list of appliances "commissioned" to that account or the IP address that each of those appliances uses to communicate to a remote server. Thus, it will be understood that the present subject matter is not limited to any particular domestic appliance and may include one or more laundry appliances (e.g., a washing machine or dryer appliance) or kitchen appliances (e.g., a refrigerator, a microwave, a coffee maker, user engagement system, etc.).

Figure 3:
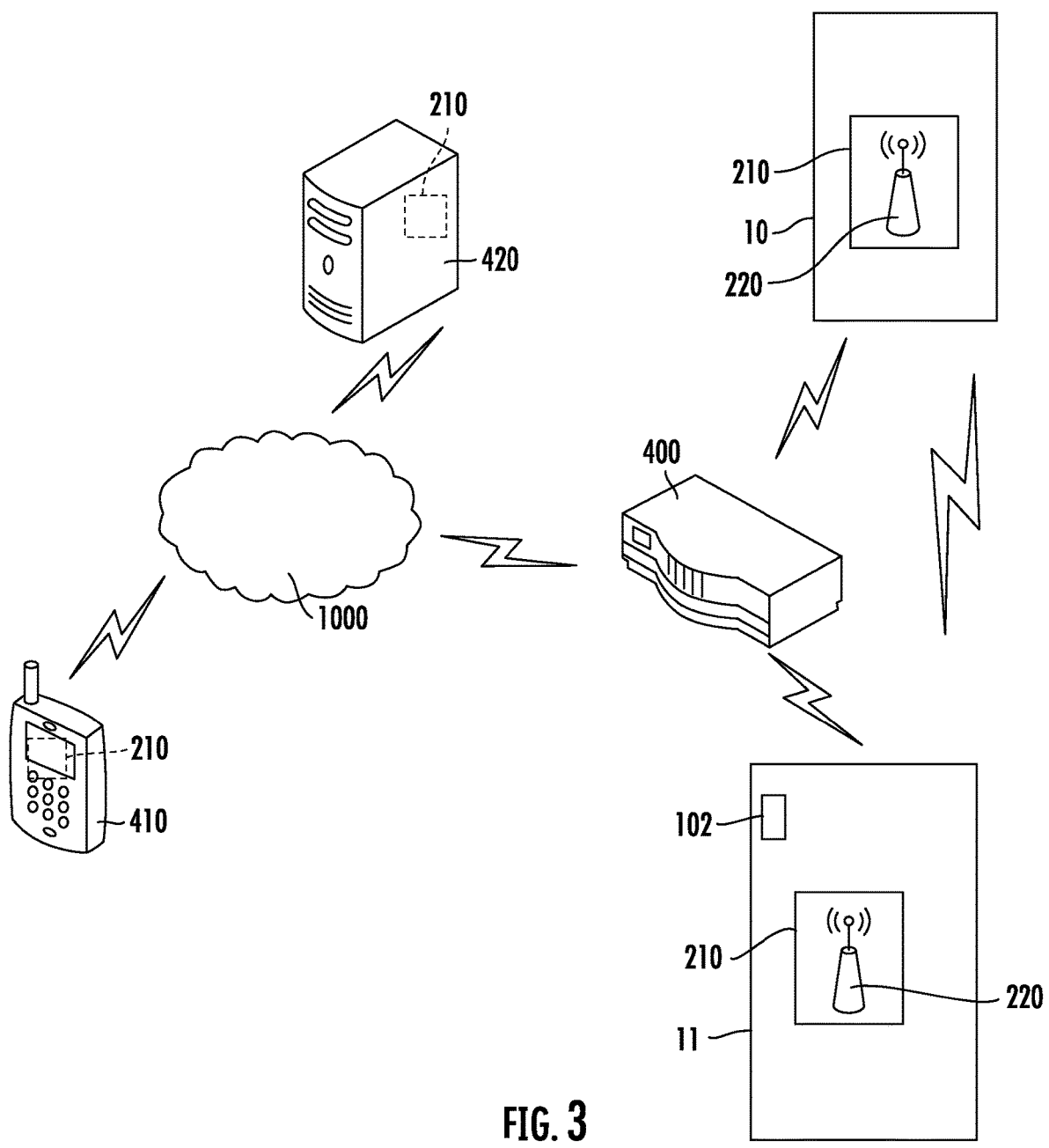
FIG. 3 provides a schematic view of multiple appliances being indirectly connected with one or more devices according to exemplary embodiments of the present disclosure.
Figure 4:
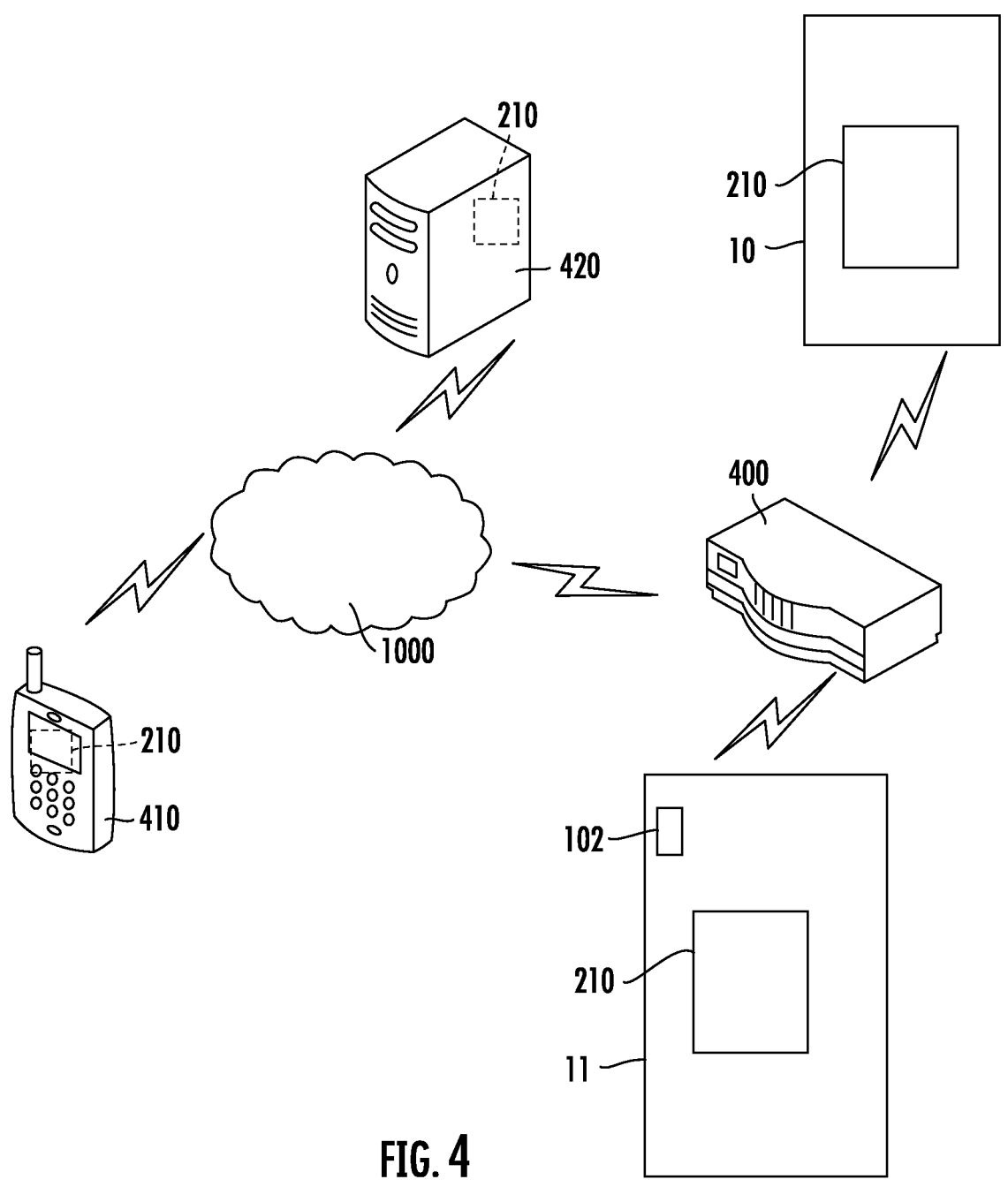
FIG. 4 provides a schematic view of multiple appliances being directly connected with each other according to exemplary embodiments of the present disclosure.

Turning now generally to FIGS. 3 and 4, two or more appliances (e.g., first appliance 10 or second appliance 11-FIGS. 1 and 2) may be configured to communicate with one or more separate, external devices. For instance, appliances 10, 11 may be configured to communicate with each other, a remote user interface device 410, or a remote server 420, either directly or via one or more intermediate networks (e.g., a wide area network 1000, such as the internet). In other words, a controller 210 of one appliance (e.g., second appliance 11) may be configured to communication with a separate controller 210 of another appliance (first appliance 10). In some embodiments, the appliances 10 and 11 can separately access the wide area network 1000 via an access point, such as a modem or router 400, which may be part of a local, wireless network (e.g., WI-FI® or wireless network having a frequency between 1 GHz and 6 GHz).

The remote user interface device 410 may be a laptop computer, smartphone, tablet, personal computer, wearable device, smart home system, or various other suitable devices including a user interface (e.g., buttons or touchscreen display). In some embodiments, the remote user interface device 410 includes a controller having a memory (e.g., non-transitive storage media) for storing and retrieving programming instructions. For example, the remote user interface device 410 may be a smartphone operable to store and run applications (i.e., "apps") and may include a remote user interface provided as a smartphone app. During use, the appliances 10, 11 may be in communication with the separate external device 410 or 420 through various possible communication connections and channels, such as but not limited to wireless radio frequency (RF) channels (e.g., ZIGBEE®, BLUETOOTH®, WI-FI®, etc.) or any other suitable communication connection. In optional embodiments, one or both of the appliances 10, 11 include a beacon transmitter 220 configured to use a predetermined connection channel to transmit a universally unique identifier picked up by a compatible device, system, or appliance, such as a BLUTOOTH® Low Energy (BLE) or BLUETOOTH SMART® beacon—as would be understood.

Methods and systems according to the present disclosure advantageously provide an easy user experience for commissioning a new (i.e., uncommissioned) appliance (e.g., second appliance 11). For example, a user may be able to quickly or easily ascertain the likelihood of a connection for the new appliance (e.g., to a remote server through a local wireless network) or identify issues that might be impeding the commissioning process for adding the new appliance to a user account on a remote server 420.

FIG. 3 provides a schematic view of appliances 10 and 11 communicating with a remote server 420, such as during or following a commissioning operation (e.g., for the first time). In particular, first appliance 10 may connect to second appliance (e.g., directly) via a secondary connection channel prior to or simultaneously with second appliance 11 connecting to a local wireless network or router 400. In some embodiments, first appliance 10 may be able to identify or establish a connection to the second appliance 11 through a beacon transmitter 220 (e.g., provided on second appliance 11). Optionally, a discrete beacon transmitter 220 may be provided on each appliance 10, 11. First appliance 10 or remote user interface device 410 may communicate with the remote server 420 (e.g., via a router 400 connected to the wide area network 1000). Additionally or alternatively, first appliance 10 may be a previously commissioned domestic appliance that is connected directly to the router 400 (e.g., to communicate with remote server 420 through the wide area network 1000). In other words, first appliance 10 may be connected directly to the corresponding local wireless network (e.g., WI-FI® network) maintained by router 400.

It should be understood that two appliances 10 and 11 are illustrated by way of example only, in at least some embodiments, more than one new appliance (e.g., two new appliances, three new appliances, or more) may be commissioned at the same time.

In some embodiments, commissioning (e.g., a commissioning operation) of a new or uncommissioned appliance (e.g., second appliance 11) is initiated by requesting to add the new appliance to a user account and by manipulating a user input 102 (e.g., pressing a button on the user interface of second appliance 11). Prior to or subsequent to manipulation of a user input at second appliance 11, first appliance 10 may connect (e.g., establish a wireless connection) with second appliance. For instance, first appliance may scan a set low-energy wireless network (e.g., in the 2 Ghz frequency, such as may be provided for a BLE network). Such a scan may use the controller 210 of first appliance 11 (e.g., with or without a beacon transmitter 220 of the same) and, optionally, identify or detect second appliance from a corresponding beacon signal transmitted from the beacon transmitter 220 of second appliance (e.g., as is generally understood). Thus, first appliance 10 and second appliance 11 may be able to transmit signals with or between each other through the secondary connection channel. With or subsequent to establishing the connection, first appliance 10 may transmit a signal-strength request to second appliance 11. In response to receiving the request, second appliance 11 may measure, evaluate, or otherwise obtain the signal strength of one or more radio signals. Specifically, such radio signals may correspond to one or more networks (e.g., WI-FI® or IEEE 802.11 networks), including the local wireless network corresponding to router 400. In turn, and as would be understood, the signal-strength data may include or be provided as received signal strength indicator (RSSI) measurements indicating detectable power of a received radio signal.

Once obtained (e.g., in response to the request from first appliance 10), the signal-strength data of second appliance 11 may be transmitted to first appliance 10, such as via the secondary connection channel. Subsequently, the signal-strength data may be evaluated (e.g., at first appliance 10 or remote server 420—such as might occur if retransmitted to remote server 420 from first appliance 10). As noted above, the signal-strength data may include one or more measurements or data points corresponding to the local wireless network. Thus, the strength of connection between second appliance 11 and the local wireless network may be evaluated. In some such embodiments, the strength is compared to one or more set thresholds (e.g., a minimum strength threshold). Optionally, the signal-strength data may include one or more data points or measurements corresponding to multiple discrete networks. Each network and data point may have a distinct network service set identifier (SSID). The first appliance 10 may include an SSID for the local wireless network (e.g., as the network to which the first appliance 10 is connected). The evaluation may, in turn, include identifying the local wireless network from a plurality of networks included in the signal-strength data. Based on the evaluation, a user alert may be generated. For instance, if or when the signal-strength data is determined to be below a set threshold, the user alert may be initiated. Optionally, the user alert may be presented as a visual or audible indication or message at the first appliance 10 or the user device 410.

Following or based on the user alert, a user may be guided on steps to improve signal strength (e.g., by adjusting router placement or incorporation of a range extender) such that the second appliance 11 may be connected to directly to the local network. For instance, the second appliance 11 may receive a network credential (e.g., password for network access) and apply the received network credential to connect directly to the user's local, wireless network (e.g., home WI-FI® network) via the router 400, as illustrated in FIG. 4. Once connected directly to the router 400, the second appliance 11 may then connect to the remote server 420 or device 410 via the router 400 and wide area network 1000. Thus, the second appliance 11 may be able to communicate directly with the remote server 420 through the wide area network 1000 and wireless network of the router 400. Additionally or alternatively, the second appliance 11 (e.g., controller 210 thereof) may transmit the account token to the remote server 420. The remote server 420 may use the account token to verify or permit the connection to second appliance 11. The server 420 may then associate the second appliance 11 with the user account, as would be understood.

Figure 5:
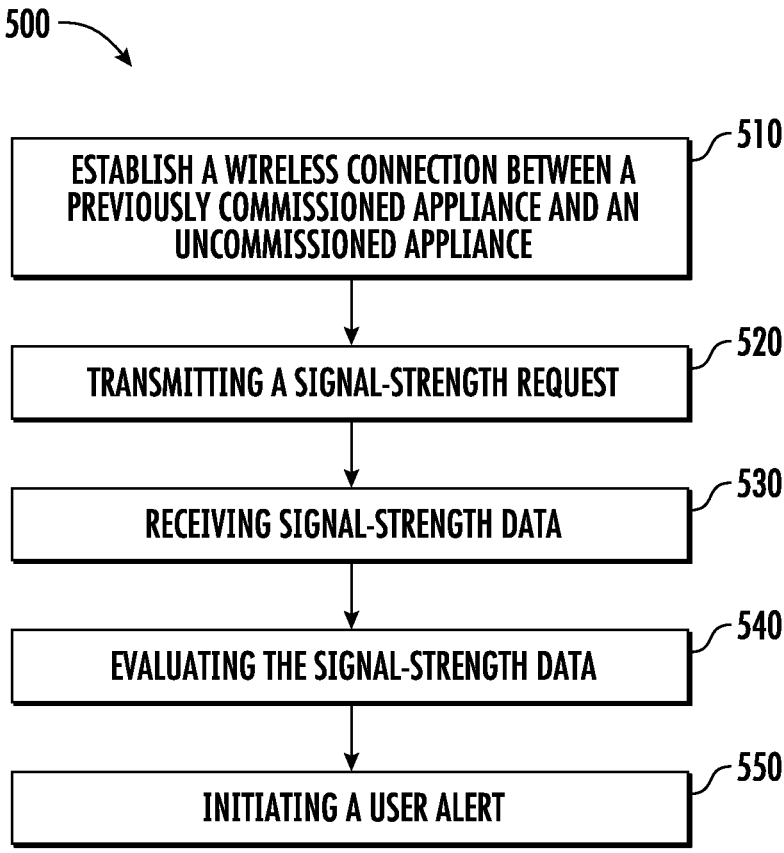
FIG. 5 provides a flow chart illustrating a method of securing communication between a first domestic appliance and a second domestic appliance through a remote server according to exemplary embodiments of the present disclosure.

Turning now to FIG. 5, various methods may be provided for use of a system, appliances (e.g., first appliance 10 or second appliance 11), or remote server (e.g., remote server 420) in accordance with the present disclosure. In general, the various steps of methods (e.g., method 500) as disclosed herein may, in exemplary embodiments, be performed by one or more controllers 210 (e.g., of first appliance 10, second appliance 11, or remote server 420) as part of an operation that a controller 210 is configured to execute (e.g., as, or as part of, a secure communication operation). During such methods, the controller 210 may receive inputs and transmit outputs from various other components or external devices. In particular, the present disclosure is further directed to methods, such as curing communication between a first domestic appliance and a second domestic appliance.

FIG. 5 depicts steps performed in a particular order for purpose of illustration and discussion. Those of ordinary skill in the art, using the disclosures provided herein, will understand that steps of any of the methods disclosed herein can be modified, adapted, rearranged, omitted, or expanded in various ways without deviating from the scope of the present disclosure, except as otherwise indicated. In certain embodiments, such methods may advantageously facilitate commissioning a new appliance (e.g., while identifying or alerting a user as to potential connection issues).

At 510, the method 500 includes establishing a wireless connection between a previously commissioned appliance (e.g., first appliance) and an uncommissioned appliance (e.g., second appliance). In particular, the previously commissioned appliance and the uncommissioned appliance may be connected over a secondary connection channel. Such a secondary connection channel may be a direct wireless connection channel, such as between two beacons provided on the appliances (e.g., one beacon at each appliance). The secondary connection channel may include or be set at specific frequency, such as 2 Megahertz (MHz), and may include a connection made according to a BLUETOOTH® Low Energy (BLE) protocol, as is understood.

Optionally, the wireless connection between the previously commissioned and uncommissioned appliances may be prompted or initiated automatically (e.g., without direct user input). In some embodiments, prior to 510, the method 500 includes scanning a low-energy wireless network (e.g., BLE or 2 MHz) at the previously commissioned appliance. Specifically, the previously commissioned appliance may scan for a new appliance, such as the uncommissioned appliance.

At 520, the method 500 includes transmitting a signal-strength request to the uncommissioned appliance from the previously commissioned appliance (e.g., with or subsequent to 510). Thus, the previously commissioned appliance may initiate a measurement, evaluation, or obtaining an indication of the signal strength of a local wireless network at the uncommissioned appliance (e.g., as described above).

At 530, the method 500 includes receiving signal-strength data corresponding to the local wireless network from the uncommissioned appliance. For instance, as part of the signal-strength request, the uncommissioned appliance may be further prompted to transmit the measurement, evaluation, or obtained indication of the signal strength (e.g., provided as signal-strength data at the uncommissioned appliance) back to the previously commissioned appliance. Generally, the local wireless network is distinct and separate from the secondary connection channel. For instance, the local wireless network may be a WI-FI® or IEEE 802.11 network corresponding to a proximal router. The received signal-strength data may include received signal strength indicator (RSSI) data from the uncommissioned appliance for the local wireless network. Optionally, the previously commissioned appliance may be connected to the local wireless network (e.g., prior to 510, 520, or 530).

At 540, the method 500 includes evaluating the signal-strength data. For instance, the previously commissioned appliance may evaluate the signal-strength data received from the uncommissioned appliance. In some embodiments, 540 includes identifying the local wireless network from the signal-strength data based on a stored service set identifier. For instance, the previously commissioned appliance may be connected (or have been previously connected to the local wireless network) and reference the stored SSID for the local wireless network to identify or match the signal-strength data point(s) corresponding to the local wireless network from a plurality of networks included in the received signal-strength data. In additional or alternative embodiments, 540 includes comparing the received signal-strength data to a minimum strength threshold. Thus, 540 may include determining the received signal-strength data is at or above the minimum strength threshold or, alternately, below the minimum strength threshold.

At 550, the method 500 includes initiating a user alert (e.g., from the previously commissioned appliance) based on the evaluated signal-strength data. For instance, the previously commissioned appliance or user device may be prompted to generate a visual or audible indication or message. In some embodiments, the user alert indicates the signal-strength of the local wireless network is insufficient (e.g., to maintain a stable connection, which might otherwise permit commissioning of the new uncommissioned appliance). Optionally, initiating the user alert may be in response to the received signal-strength data being determined to be below the minimum strength threshold.

Once a stable threshold (e.g., above the minimum strength threshold) is evaluated or confirmed, the method 500 may proceed with commissioning of the uncommissioned appliance to a user's account, as would be understood in light of the present disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of commissioning a domestic appliance, the method comprising:
   establishing a wireless connection between a previously commissioned appliance and an uncommissioned appliance over a secondary connection channel;
   transmitting a signal-strength request to the uncommissioned appliance from the previously commissioned appliance;
   receiving signal-strength data corresponding to a local wireless network from the uncommissioned appliance;
   evaluating the signal-strength data; and
   initiating a user alert from the previously commissioned appliance based on the evaluated signal-strength data; wherein evaluating the signal-strength data comprises comparing the received signal-strength data to a minimum strength threshold; and
   wherein the received signal-strength data is determined to be below the minimum strength threshold, wherein initiating the user alert is in response to the received signal-strength data being determined to be below the minimum strength threshold.

2. The method of claim 1, further comprising:
   scanning a low-energy wireless network for the uncommissioned appliance at the previously commissioned appliance prior to establishing the wireless connection between the previously commissioned appliance and the uncommissioned appliance.

3. The method of claim 1, wherein the secondary connection channel is a direct wireless connection channel.

4. The method of claim 3, wherein the secondary connection channel includes a 2 MHz channel.

5. The method of claim 1, wherein the local wireless network is distinct and separate from the secondary connection channel.

6. The method of claim 1, wherein the received signal-strength data comprises received signal strength indicator (RSSI) data from the uncommissioned appliance.

7. The method of claim 1, wherein evaluating the signal-strength data comprises identifying the local wireless network from the signal-strength data based on a stored service set identifier.

8. A domestic appliance comprising:
   a cabinet; and
   a controller configured to initiate a commissioning operation, the commissioning operation comprising
      establishing a wireless connection between the domestic appliance and an uncommissioned appliance over a secondary connection channel,
      transmitting a signal-strength request to the uncommissioned appliance from the domestic appliance,
      receiving signal-strength data corresponding to a local wireless network from the uncommissioned appliance,
      evaluating the signal-strength data, and
      initiating a user alert from the domestic appliance based on the evaluated signal-strength data, wherein evaluating the signal-strength data comprises comparing the received signal-strength data to a minimum strength threshold, and
   wherein the received signal-strength data is determined to be below the minimum strength threshold, wherein initiating the user alert is in response to the received signal-strength data being determined to be below the minimum strength threshold.

9. The domestic appliance of claim 8, wherein the commissioning operation further comprises scanning a low-energy wireless network for the uncommissioned appliance at the domestic appliance prior to establishing the wireless connection between the domestic appliance and the uncommissioned appliance.

10. The domestic appliance of claim 8, wherein the secondary connection channel is a direct wireless connection channel.

11. The domestic appliance of claim 10, wherein the secondary connection channel includes a 2 MHz channel.

12. The domestic appliance of claim 8, wherein the local wireless network is distinct and separate from the secondary connection channel.

13. The domestic appliance of claim 8, wherein the received signal-strength data comprises received signal strength indicator (RSSI) data from the uncommissioned appliance.

14. The domestic appliance of claim 8, wherein evaluating the signal-strength data comprises identifying the local wireless network from the signal-strength data based on a stored service set identifier.

* * * * *